3,037,910
PROCESS FOR TREATMENT OF HYPERTENSION
Frederick Charles Copp and Douglas Stephenson, London, England, assignors to Burroughs Wellcome & Co. (U.S.A.) Inc., Tuckahoe, N.Y., a corporation of New York
No Drawing. Filed Apr. 15, 1959, Ser. No. 806,488
Claims priority, application Great Britain Apr. 18, 1958
6 Claims. (Cl. 167—65)

The present invention relates to quaternary ammonium compounds and the preparation thereof.

It has been found that compounds containing the cation of Formula I are effective antiadrenergic agents.

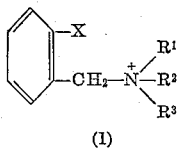

(I)

In this and succeeding formulae:

X is a hydrogen atom when $R^1$ is a 2-hydroxyethyl group, $R^2$ is a methyl group, and $R^3$ is a methyl, ethyl or 2-hydroxyethyl group; or X is a halogen atom or a methyl or nitro group when $R^1$ is an ethyl, 2-hydroxyethyl, isopropyl or allyl group and $NR^2R^3$ is a dimethylamino or pyrrolidino group; or when $R^1$ is a methyl group and $R^2$ and $R^3$ are the same or different and are ethyl or 2-hydroxyethyl groups.

The anion associated with the cation of Formula I may be any suitable anion, for example chloride, bromide, iodide, methylsulphate, sulphate, p-toluenesulphonate, embonate, or any pharmaceutically acceptable anion.

The preferred cations are the N-benzyl-N-2-hydroxyethyl - N:N - dimethylammonium, N-o-bromobenzyl-N-ethyl - N:N - dimethylammonium, N-o-bromobenzyl-N-2-hydroxyethyl-N:N - dimethylammonium, N-o-methylbenzyl-N-2-hydroxyethyl-N:N-dimethylammonium and N-o-bromobenzyl-N-ethylpyrrolidinium cations.

It has been shown that compounds containing the cation of Formula I have a highly selective blocking effect on the peripheral sympathetic nervous system. They prevented the relaxation of the rabbit ileum caused by stimulating its adrenergic nerve supply. When they were injected into cats a reduction of sympathetic tone was indicated by a long-lasting relaxation of the nictitating membranes.

This effect occurred at doses well below toxic levels and was not accompanied by any effects other than those on the sympathetic nervous system; in particular the compounds did not cause mydriasis nor any other impairment of parasympathetic functions as do ganglion blocking agents, nor cause central depression as does reserpine. These properties render the compounds useful for the reduction of sympathetic tone, for example in the treatment of hypertension.

The selective blocking effect has been shown, using N-o-bromobenzyl-N-ethyl-N:N-dimethylammonium bromide as a representative example of this type of compound, to involve the selective accumulation of the compound in adrenergic nerves. N-o-bromobenzyl-N-ethyl-N:N-dimethylammonium bromide labelled in one of its methyl groups with $C^{14}$ was injected into cats at a dose level sufficient to release the nictitating membranes for 24 hours. The level of radioactivity indicated that the concentrations of the compound in adrenergic nerves far exceeded those in other tissues. When applied topically to adrenergic nerves in a number of in vitro and in vivo preparations such concentrations blocked transmission. In cats the compound lowered the blood pressure, particularly when the animal was in a vertical position and also blocked the cardioaccelerans nerve. It prevented the contraction of the nictitating membranes caused by stimulation of either the pre- or postganglionic cervical sympathetic nerve, which indicated that its side of action is peripheral to the ganglion. It prevented the vasoconstriction of the perfused rabbit ear caused by stimulation of the greater auricular nerve and the contraction of the rabbit uterus elicited through the hypogastric nerve. It did not impair the function of the adrenal medulla in so far as it did not prevent the pressor effect of splanchnic nerve stimulation in the cat and did not deplete the catechol amine content of the tissues of the cat and rat as does reserpine.

In clinical trials N-o-bromobenzyl-N-ethyl-N:N-dimethylammonium bromide and p-toluenesulphonate are being used successfully for the treatment of hypertension, effectively controlling the blood pressure of patients without causing the side effects associated with other hypotensive agents. The dose range suitable for the administration of these and other compounds containing the cation of Formula I is from 20 mg. to 1.5 g. For continuous medication dosing two or three times a day is usually desirable.

The present invention, therefore, provides a process for the treatment of hypertension which comprises the administration of quaternary ammonium compounds containing the cation defined in Formula I.

The compounds of the present invention are preferably prepared by the reaction of an appropriate tertiary amine, having all but one of the groups desired in the quaternary ammonium compound attached directly to the nitrogen atom, with a reactive derivative of the group it is desired to introduce. This type of reaction is commonly known as a "quaternisation reaction."

For example, the compounds of the present invention may be prepared by the quaternisation of a tertiary amine with a benzylating agent, as indicated by Reaction i.

(i)

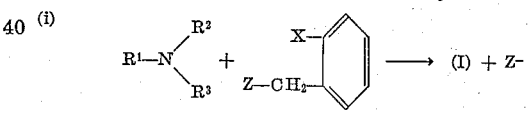

In these formulae X is a reactive group, for example a chloride, bromide, iodide or sulphonic ester group, $-O.SO_2Y$, wherein Y is a substituted or unsubstituted hydrocarbon such as a p-tolyl group. This reaction may be effected in a solvent, for example acetone, methylethyl ketone or isopropanol.

Another example of this method of preparation is the quaternisation of a tertiary benzylamine of Formula II with a reactive derivative of the aliphatic group it is desired to introduce, as indicated by Reaction ii.

(ii)

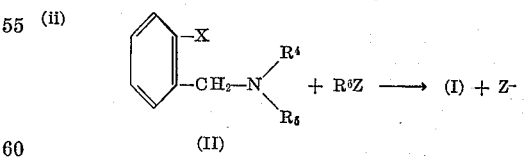

(II)

The tertiary amine of Formula II may be formed in situ, if $R^1$, $R^2$ and $R^3$ are all aliphatic groups and if two of these groups are the same, by the reaction of a secondary benzylamine with a reactive derivative of the aliphatic group it is desired to introduce, as indicated by Reaction iii.

(iii)

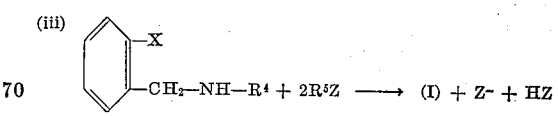

In both Reactions ii and iii $R^4$, $R^5$ and $R^6$ each represent, as appropriate, one of the groups R¹, R² and R³, and Z is as defined above. It will be understood that Reaction iii proceeds with the intermediate formation of the tertiary benzylamine of Formula II and therefore amounts to the simultaneous formation of this amine and its quaternisation.

As specific examples of reactive derivatives which may be used in Reactions ii and iii, methyl iodide, dimethyl sulphate, methyl p-toluenesulphonate, ethyliodide, ethyl p-toluenesulphonate, 2-hydroxyethyl bromide and allyl bromide may be mentioned. Both reactions may be effected in a solvent, for example acetone, methylethyl ketone, ethyl acetate or methanol, and it is often preferable to use rather more than one or two molecular proportions in the two reactions respectively of the reactive derivative of the aliphatic group it is desired to introduce to obtain good yields of the compounds of Formula I. Reaction iii requires the presence of an acid binding agent, for example an alkaline salt such as sodium or potassium carbonate.

Another example of this method of preparation, applicable to compounds of the present invention wherein NR²R³ is a pyrrolidino group, is the intramolecular quaternisation of a tertiary butylamine of Formula III, wherein Z is as defined above.

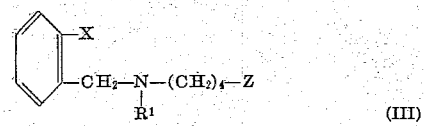

(III)

The amine of Formula III may be prepared, as the salt, by the reaction of the corresponding hydroxy compound, that is a compound of Formula III wherein Z is a hydroxy group, with a halogenating agent, for example thionyl chloride and hydrobromic and hydriodic acids, or with a sulphonyl chloride, for example p-toluenesulphonyl chloride. The salt is converted into the free amine base and the rearrangement is effected by heating this base either alone or in a solvent such as isobutanol, a mixture of benzene and light petroleum or a mixture of benzene and ethanol, the rate of reaction varying with the nature of Z.

The compounds of the present invention, wherein NR²R³ is a pyrrolidino group, may also be prepared by the reaction of a secondary benzylamine of Formula IV with a 1,4-disubstituted butane of Formula V, as indicated by Reaction iv.

(iv)

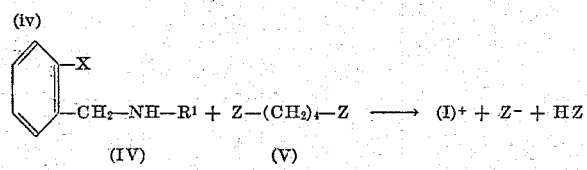

(IV)        (V)

In Formula V, Z is as defined above, though the two groups may be different. As specific examples of compounds of Formula V, 1,4-dibromobutane, 1,4-dichlorobutane, 1,4-dimethylsulphonyloxybutane, 1,4-di-p-toluenesulphonyloxybutane and 1-bromo-4-chlorobutane may be mentioned. The reaction is effected in the presence of an acid binding agent, for example an alkaline salt such as sodium or potassium carbonate, by heating alone or in a solvent such as isobutanol or a mixture of benzene and ethanol. It will be understood that Reaction iv proceeds with the intermediate formation of the tertiary butylamine of Formula III and therefore amounts to the simultaneous preparation of this amine and its intramolecular quaternisation into a compound of the present invention.

The salt of the quaternary ammonium cation of Formula I produced by the above described method of preparation will be the salt of the group Z and may be converted by double decomposition, either during or after the described reactions, for example in solution or on an ion exchange column, into the salt of another anion. This may be particularly desirable if the two Z groups of a compound of Formula V used in Reaction iv are different, for example if 1-bromo-4-chlorobutane is used.

The compounds of the present invention may be presented in pharmaceutical preparations prepared by any of the well-known methods of pharmacy.

For oral administration, fine powders or granules of the compounds may contain diluents and dispersing and surface active agents, and may be presented in a draft in water or in a syrup, in capsules or cachets in the dry state or in a non-aqueous suspension, when a suspending agent may be included; in tablets, when binders and lubricants may be included; or in a suspension in water or a syrup or an oil, or in a water/oil emulsion, when flavouring, preserving, suspending, thickening and emulsifying agents may be included. The granules or the tablets may be coated.

For parenteral administration, the compounds may be presented in aqueous injection solutions which may contain antioxidants, buffers, bacteriostats, agents which solubilise a relatively insoluble compound, and solutes which render the salts isotonic with the blood; in aqueous suspensions when suspending agents and thickening agents may be included; or in non-aqueous solutions and suspensions if the compound is affected by water. Extemporaneous injection solutions may be prepared from sterile pills, granules or tablets which may contain diluents, dispersing and surface active agents, binders and lubricants.

The compounds may also be presented in suppositories or pessaries by incorporation in a suppository base.

The invention will now be described by reference to the following examples, in which all temperatures are given in degrees centigrade.

EXAMPLE 1

A solution of ethylene oxide (24 ml.) and o-methylbenzylamine (60 g.) in methanol (80 ml.) was heated in an autoclave at 100° for 3 hours. Subsequent evaporation of the methanol and fractional distillation of the residue in vacuo gave 1-hydroxy-2-o-methylbenzylaminoethane, boiling point 118–124°/0.9 mm.

A mixture of this base (3 g.), anhydrous sodium carbonate (3 g.) and methyl iodide (5 ml.) in acetone (20 ml.) was heated to reflux for 1 hour and then filtered whilst still hot. Addition of ethyl acetate to the filtrate gave N-2-hydroxyethyl-N:N-dimethyl-N-o-methylbenzylammonium iodide, which was recrystallised from a mixture of ethanol and ethyl acetate, melting poins 118–119°.

EXAMPLE 2

A solution of ethyl iodide (6 g.) and N:N-dimethyl-N-o-methylbenzylamine (5 g.) in acetone (10 ml.) was heated to reflux for 30 minutes and ether was then added to the cooled reaction mixture. The resulting N-ethyl-N:N-dimethyl-N-o-methylbenzylammonium iodide was recrystallised from isopropanol, and melted at 78–81°.

EXAMPLE 3

Allyl bromide (6 g.) was added slowly to a solution of N:N-dimethyl-N-o-methylbenzylamine (6 g.) in acetone (10 ml.). Reaction took place with the separation of a crystalline solid. After standing for 1 hour, the mixture was heated to reflux for 30 minutes. It was then cooled and the resulting N-allyl-N:N-dimethyl-N-o-methylbenzylammonium bromide collected and recrystallized from a mixture of ethanol and ether, melting point 159–160°.

EXAMPLE 4 o-Chlorobenzyl chloride (4.0 g.) was added slowly to a solution of 1-dimethylamino-2-hydroxyethane (3.3 g.) in acetone (10 ml). The mixture warmed spontaneously. After 90 minutes the mixture was heated to reflux for 10 minutes. Addition of ether to this cooled reaction mixture gave N-o-chlorobenzyl-N-2-hydroxyethyl-N:N-dimethylammonium chloride as a deliquescent solid which could not be recrystallised. It was dried thoroughly in vacuo and melted at 72–75°.

EXAMPLE 5

A solution of N-o-chlorobenzyl-N:N-dimethylamine (5 g.) and ethyl iodide (5 g.) in acetone (15 ml.) was heated to reflux for 30 minutes. Addition of ether to the cooled reaction mixture gave N-o-chlorobenzyl-N-ethyl-N:N-dimethylammonium iodide which was recrystallised from isopropanol, melting point 129–130°.

EXAMPLE 6 o-Chlorobenzyl chloride (40 g.) was slowly added with cooling and stirring to a solution of isopropylamine (59 g.) in methanol (200 ml.). After 48 hours the solvent and excess isopropylamine were evaporated and excess aqueous 5 N-sodium hydroxide was added to the residue. The resulting N-o-chlorobenzyl-N-isopropylamine was extracted with ether. This ethereal extract was dried over solid potassium hydroxide, filtered and evaporated, and the residue was distilled in vacuo, boiling point 115–117°/18 mm.

A mixture of this base (5 g.), anhydrous sodium carbonate (5 g.), and methyl iodide (10 g.) in acetone (30 ml.) was heated to reflux for 30 minutes and then filtered whilst still hot. Addition of ethyl acetate or ether to the filtrate gave N-o-chlorobenzyl-N:N-dimethyl-N-isopropylammonium iodide which was recrystallized from isopropanol, melting point 165–166°.

EXAMPLE 7 o-Bromobenzyl bromide (20 g.) was added slowly to methanolic dimethylamine (50% w./w.; 70 ml.) with cooling to keep the temperature at 10–20°. After 24 hours the mixture was evaporated on a steam-bath and excess aqueous 5 N-sodium hydroxide was added to the cooled residue. The resulting N-o-bromobenzyl-N:N-dimethylamine was extracted with ether. The ethereal extract was dried over solid potassium hydroxide, filtered and evaporated, and the residue was distilled in vacuo, boiling point 108–112°/20 mm.

A solution of this base (5 g.) and ethyl iodide (4.5 g.) in acetone (15 ml.) was heated to reflux for 30 minutes. Addition of ether or ethyl acetate to the cooled reaction mixture gave N-o-bromobenzyl-N-ethyl-N:N-dimethylammonium iodide which was recrystallised from acetone and ethyl acetate or from isopropanol, melting point 116–117°, with softening at 114°.

EXAMPLE 8 o-Bromobenzyl bromide (25 g.) was added slowly to a cooled solution of N-ethyl-N-methylamine (12 g.) in methanol (20 ml.). After 48 hours, the mixture was evaporated on a steam-bath and excess aqueous 5 N-sodium hydroxide added. The resulting N-o-bromobenzyl-N-ethyl-N-methylamine was extracted with ether. The extract was dried over solid potassium hydroxide, filtered and evaporated, and the residue was distilled in vacuo, boiling point 120–122°/20 mm.

Methyl iodide (3.5 g.) was added to a solution of this base (4.5 g.) in ethyl acetate (40 ml.). N-o-bromobenzyl-N-ethyl-N:N-dimethylammonium iodide rapidly crystallised from the mixture. It was filtered off and recrystallised from isopropanol, melting point 116–117°, after softening at 114°, and was identical with the product from the last example.

EXAMPLE 9 o-Bromobenzyl iodide (3 g.) was added slowly to a solution of N-ethyl-N:N-dimethylamine (0.9 g.) in acetone (5 ml.) with cooling. A clear solution formed which subsequently crystallised. After 24 hours the resulting N-o-bromobenzyl-N-ethyl-N:N-dimethylammonium iodide was filtered off and recrystallised from isopropanol, melting point 117–118°, after softening at 114°. It was identical with the products from the two preceding examples.

EXAMPLE 10 o-Bromobenzyl bromide (25 g.) was added slowly to a cooled solution of N-ethyl-N:N-dimethylamine (8.0 g.) in acetone (40 ml.). Reaction took place with the separation of a crystalline solid. After 96 hours the mixture was heated to reflux for 1 hour, cooled, and the solid N-o-bromobenzyl-N-ethyl-N:N-dimethylammonium bromide filtered off and recrystallised from isopropanol and ethyl acetate, melting point 164–165°.

EXAMPLE 11 o-Bromobenzyl bromide (25 g.) was slowly added to a cooled solution of diethylamine (19 g.) in benzene (50 ml.). There was a vigorous reaction. After standing for 24 hours, the mixture was heated to reflux for 1 hour, cooled and filtered, and the residue was washed well with fresh benzene. The combined filtrate and washings were shaken with excess aqueous 5 N-sodium hydroxide and the aqueous layer was removed. The residual benzene layer was dried over solid potassium hydroxide, filtered and evaporated, and the residue was distilled in vacuo. N-o-bromobenzyl-N:N-diethylamine was obtained as a colourless liquid, boiling point 130–134°/17 mm.

A solution of this base (3.0 g.) and methyl iodide (3.5 g.) in acetone (10 ml.) was heated to reflux for 30 minutes. It was then cooled and ethyl acetate was slowly added, when a mass of crystals separated. The resulting N-o-bromobenzyl-N:N-diethyl-N-methylammonium iodide was recrystallised from a mixture of ethanol and ethyl acetate, melting point 113–115°.

EXAMPLE 12 o-Bromobenzyl bromide (25 g.) was slowly added to a cooled solution of isopropylamine (18 g.) in methanol (50 ml.). After standing at room temperature for 72 hours the resulting solution was evaporated on the steam-bath. The residue was treated with excess aqueous 5 N-sodium hydroxide and the precipitated oil was taken up into ether. The ethereal extract was dried over potassium hydroxide, filtered, evaporated, and the residue was distilled in vacuo to give N-o-bromobenzyl-N-isopropylamine, boiling point 119–122°/12 mm.

A mixture of this base (4.5 g.), methyl iodide (7.0 g.) and anhydrous sodium carbonate (2.0 g.) in acetone (20 ml.) was heated to reflux for 2 hours. The mixture was filtered hot and the insoluble inorganic residue was washed with fresh hot acetone. N-o-bromobenzyl-N:N-dimethyl-N-isopropylammonium bromide rapidly crystallised. It was collected and recrystallised from isopropanol, melting point 174–175°, after softening at 172°.

EXAMPLE 13

Allyl bromide (2.6 g.) was added slowly to a cooled solution of N - o - bromobenzyl - N:N - dimethylamine (4.0 g.) in acetone (10 ml.). After the initial spontaneous reaction was complete, the mixture was heated to reflux for 30 minutes, cooled, and ether was added, when N-allyl-N-o-bromobenzyl-N:N-dimethylammonium bromide separated as a crystalline solid. The product, which is very deliquescent, was filtered off and recrystallised by careful precipitation from boiling acetone with ether, melting point 116–117°.

EXAMPLE 14 o-Bromobenzyl bromide (8.3 g.) was added slowly to a solution of 1-dimethylamino-2-hydroxyethane (3.0 g.) in acetone (10 ml.). Reaction took place with the separation of an oil. Ether was added, when the resulting N-o-bromobenzyl-N-2-hydroxyethyl - N:N - dimethylammonium bromide slowly solidified. The solid, which

EXAMPLE 15 o-Iodobenzyl bromide (2.2 g.) was added with cooling to a solution of ethyldimethylamine (0.5 g.) in methanol (2.5 ml.). An oil separated. After standing for 24 hours, the mixture was warmed to 40° for 30 minutes. On cooling, the oil crystallised. The resulting N-ethyl-N-o-iodobenzyl-N:N-dimethylammonium bromide was recrystallised from isopropanol and ether, melting point 145–146°.

EXAMPLE 16 o-Iodobenzyl bromide (2.2 g.) was added slowly to a solution of 1-dimethylamino-2-hydroxyethane (0.68 g.) in acetone (2.5 ml.) with cooling. An oil separated which subsequently crystallised. After 3 hours, the mixture was heated to reflux for 1 hour and then cooled. The resulting N-2-hydroxyethyl-N-o-iodobenzyl-N:N-dimethylammonium bromide was recrystallised from warm isopropanol, melting point 110–112°.

EXAMPLE 17 o-Fluorobenzylbromide (6.4 g.) was slowly added to a solution of 1-dimethylamino-2-hydroxyethane (3.05 g.) in acetone (10 ml.). The mixture warmed spontaneously and a crystalline solid separated. After standing for 3 hours, the mixture was heated to reflux for 30 minutes, cooled, and the resulting N-o-fluorobenzyl-N-2-hydroxyethyl-N:N-dimethylammonium bromide was filtered off and recrystallised from isopropanol, melting point 118–119°.

EXAMPLE 18 o-Fluorobenzyl bromide (26.6 g.) was slowly added to a stirred solution of dimethylamine in methanol (50% w./w.; 51 g.) with cooling. The resulting mixture was stood at room temperature for 24 hours and then evaporated on a steam-bath. Excess aqueous 5 N-sodium hydroxide was added to the residue and the mixture extracted several times with ether. The combined ethereal extracts were dried over solid potassium hydroxide, filtered, evaporated, and the residue was distilled in vacuo to give N-o-fluorobenzyl-N:N-dimethylamine, boiling point 85–92°/27 mm.

A solution of this base (5.1 g.) and ethyl iodide (6.0 g.) in acetone (10 ml.) was heated to reflux for 45 minutes. After cooling, the separated N-ethyl-N-o-fluorobenzyl-N:N-dimethylammonium iodide was filtered off and recrystallised from isopropanol, melting point 130–131°.

EXAMPLE 19 o-Nitrobenzyl bromide (2.16 g.) was added slowly to a cooled solution of ethyldimethylamine (0.8 g.) in acetone (10 ml.). A clear solution formed which soon deposited a crystalline solid. The final mixture was stood at room temperature for 24 hours and then was warmed to 40° for 1 hour. The resulting N-ethyl-N:N-dimethyl-N-o-nitrobenzylammonium bromide was filtered off and recrystallised from isopropanol, melting point 148–149°.

EXAMPLE 20

A solution of o-methylbenzyl chloride (7.0 g.) and N:N-di-(2-hydroxyethyl)-N-methylamine (6.0 g.) in acetone (20 ml.) was heated to reflux for 90 minutes. The resulting N:N-di-(2-hydroxyethyl)-N-methyl-N-o-methylbenzylammonium chloride was filtered off and recrystallised twice from isopropanol, melting point 114–115°.

EXAMPLE 21

A solution of o-chlorobenzyl chloride (4.8 g.) and N:N-di-(2-hydroxyethyl)-N-methylamine (3.6 g.) in acetone (15 ml.) was heated to reflux for 1 hour. The resulting N-o-chlorobenzyl-N:N-di-(2-hydroxyethyl)-N-methylammonium chloride was collected and recrystallised from isopropanol, melting point 120–121°.

EXAMPLE 22

A solution of o-bromobenzyl bromide (9.2 g.) and N:N-di-(2-hydroxyethyl-N-methylamine (4.4 g.) in acetone (10 ml.) was stood at room temperature for 30 minutes and then was heated to reflux for 10 minutes. The resulting N-o-bromobenzyl-N:N-di-(2-hydroxyethyl)-N-methylammonium bromide was collected and recrystallised from isopropanol, melting point 111–112°.

EXAMPLE 23 o-Bromobenzyl bromide (12.5 g.) was added slowly to a solution of pyrrolidine in methanol. After standing for 17 hours at room temperature, the mixture was heated to 50° for 30 minutes and then evaporated in vacuo. Excess 5 N-sodium hydroxide was added to the residue which was then extracted twice with ether. The combined ethereal extracts were dried over potassium carbonate, filtered and evaporated. The residue was distilled in vacuo to give N-o-bromobenzylpyrrolidine, boiling point 145–152°/20 mm.

Ethyl iodide (2.4 g.) was added to a solution of this base (2.4 g.) in acetone (5 ml.). The resulting mixture was heated to reflux for 2 hours, cooled and then treated with ether, when N-o-bromobenzyl-N-ethylpyrrolidinium iodide crystallised. This product was collected and recrystallised from isopropanol, melting point 110–111°.

EXAMPLE 24

By processes analogous to those described in Example 1, o-chlorobenzyl chloride was reacted with pyrrolidine to give N-o-chlorobenzylpyrrolidine, boiling point 136–139°/18 mm., which was subsequently reacted with ethyl iodide in acetone solution. The resulting N-o-chlorobenzyl-N-ethylpyrrolidinium iodide was recrystallised from isopropanol, melting point 125–126.5°.

EXAMPLE 25

By processes analogous to those described in Example 1, o-methylbenzyl chloride was reacted with pyrrolidine to give N-o-methylbenzylpyrrolidine, boiling point 113–115°/12 mm., which was subsequently reacted with ethyl iodide in acetone solution. The resulting N-o-methylbenzyl-N-ethylpyrrolidinium iodide was recrystallised from isopropanol, melting point 121–122°.

EXAMPLE 26 o-Bromobenzyl bromide (12.5 g.) was added to a solution of N-2-hydroxyethylpyrrolidine (7.0 g.) in acetone (60 ml.). There was a vigorous spontaneous reaction with the separation of an oil which subsequently crystallised. This solid was filtered off, washed with a little fresh acetone and dried in vacuo. It was recrystallised by precipitation from isopropanol and ether to give N-o-bromobenzyl-N-2-hydroxyethylpyrrolidinium bromide, melting point 100–101.5°.

EXAMPLE 27

A solution of ethyl p-toluenesulphonate (4.4 g.) and o-bromobenzyldimethylamine (4.3 g.) in methylethyl ketone (10 ml.) was heated to reflux for 2 hours. Ether (2 ml.) was added to the cooled solution, when a crystalline solid rapidly separated. This was filtered off and recrystallised by precipitation from acetone with ethyl acetate and a little ether. The resulting N-o-bromobenzyl-N-ethyl-N:N-dimethylammonium p-toluenesulphonate had a marked tendency to crystallise with varying amounts of water of crystallisation but prolonged drying at 60° in vacuo gave an anhydrous product, melting point 85–86°.

Alternatively, drying for 24 hours in vacuo at room temperature gave a monohydrate, melting point 78–79°.

EXAMPLE 28

Finely divided sodium hydride (2.4 g., as 50% dispersion in mineral oil) was added to a solution of o-bromobenzyl alcohol (19.3 g.) in dry ether (100 ml.). The resulting mixture was stirred at room temperature for 16 hours and then heated to reflux for 4 hours. The suspension thus formed was cooled to about −20°, stirred and treated slowly with a solution of p-toluenesulphonyl chloride (19.5 g.) in dry ether (100 ml.). The final mixture was kept overnight at 0° and then warmed to room temperature for 30 minutes. The separated inorganic material was filtered off, using a dry sintered glass funnel, and the filtrate was evaporated in vacuo until a solid began to separate. After standing overnight at 0°, the o-bromobenzyl p-toluenesulphonate was filtered off and dried in vacuo, melting point 92°.

This sulphonic ester (9.8 g.) and ethyldimethylamine (2 g.) were mixed together in ethylmethyl ketone (20 ml.). After standing for 10 minutes, the resulting solution was heated to reflux for 30 minutes, cooled, and treated with ether to precipitate N-o-bromobenzyl-N-ethyl-N:N-dimethylammonium p-toluenesulphonate, melting point 73°. It was repeatedly recrystallised by precipitation from acetone with ether and finally dried at 60° in vacuo when it had melting point 86°. It was identical with the (anhydrous) material described in Example 27.

EXAMPLE 29

A solution of disodium embonate (1.1 g.) in hot water (15 ml.) was added to a solution of N-o-bromobenzyl-N-ethyl-N:N-dimethylammonium iodide (1.85 g.) in water (5 ml.). An oil separated. This was coagulated by centrifuging, the supernatant liquors were sucked off, and the residue was washed with fresh water. More water (10 ml.) was added to the final residue of di-(N-o-bromobenzyl-N-ethyl-N:N-dimethylammonium)embonate, together with 2 N-sulphuric acid (2.5 ml.). Embonic acid was precipitated and filtered off. The filtrate had pH 4 and so a little barium carbonate was added with shaking until the pH was between 5 and 6. The suspension was refiltered and the filtrate was evaporated to dryness in vacuo. The residual gum was ground up with acetone containing 5% isopropanol to give di-(N-o-bromobenzyl-N-ethyl-N:N-dimethylammonium) sulphate as a crystalline solid, melting point 98–100°. It was very deliquescent.

EXAMPLE 30

Allyl iodide (2.1 g.) was added to a solution of N-o-bromobenzylpyrrolidine (2.4 g.) in acetone (5 ml.). After standing at room temperature for 15 minutes, the mixture was heated to reflux for 5 minutes and then treated with ether. The resulting gum was dissolved in a mixture of isopropanol and ethanol (1:1) and the solution was cautiously treated with ethyl acetate to give a gummy solid which was repeatedly crystallised from isopropanol and finally gave pure N-allyl-N-o-bromobenzylpyrrolidinium iodide, melting point 79–80°.

EXAMPLE 31 o-Bromobenzyl bromide (15 g.) was added slowly to a solution of ethyl 4-hydroxybutylamine (30 g.) in ethanol (50 ml.). The mixture warmed spontaneously. After standing for 1 hour, the mixture was heated to reflux for 15 minutes. The bulk of the ethanol was then removed by evaporation in vacuo and excess 2 N-sodium hydroxide was added to the residue. The precipitated oil was dissolved in ether and the separated aqueous layer was re-extracted with fresh ether. The combined ethereal layers were dried over solid potassium hydroxide, filtered, evaporated, and the residue was distilled in vacuo to give N-o-bromobenzyl-N-ethyl-N-4-hydroxybutylamine, boiling point 128–134°/0.5 mm.

A solution of this base (3 g.) in concentrated, iodine-free hydriodic acid, was heated to 100° in a stream of carbon dioxide. After 3 hours the mixture was cooled, when a gum separated and subsequently crystallised. The resulting N-o-bromobenzyl-N-ethyl-N-4-iodobutylamine hydriodide was filtered off, washed with water and dried in vacuo. It was recrystallised by precipitation from isopropanol with ethyl acetate, melting point 128–130°.

This salt (1.16 g.) was added to an ice-cooled mixture of light petroleum boiling point 40–60° and benzene (1:5) (10 ml.). Excess ice-cold 2 N-sodium carbonate was added and the mixture was shaken vigorously for 1 minute. The aqueous layer was removed and re-extracted immediately with fresh benzene-light petroleum mixture (10 ml.). On standing, the combined organic layers rapidly deposited an oil which crystallised on seeding with N-o-bromobenzyl-N-ethylpyrrolidinium iodide. The reaction was completed by heating to reflux for 5 minutes. The resulting N-o-bromobenzyl-N-ethylpyrrolidinium iodide was filtered off and recrystallised from isopropanol, melting point 112°. It was identical with the product described in Example 23.

EXAMPLE 32 o-Bromobenzyl bromide (50 g.) was slowly added to an ice-cooled solution of ethylamine in ethanol (33% w./w.; 100 g.). After standing for 24 hours, the mixture was evaporated and excess ammonia added to the residue. The precipitated oil was extracted with ether. The ethereal solution was washed with water, dried over potassium carbonate, filtered, evaporated, and the residual distilled in vacuo to give N-o-bromobenzyl-N-ethylamine, boiling point 118–122°/15 mm.

This base (10 g.) was added to a slurry of anhydrous sodium carbonate (6 g.) in ethanol (30 ml.). 1,4-dibromobutane (10 g.) was then added and the mixture was heated to reflux for 5 hours. The inorganic material was filtered off and ether was added to the filtrate to give a gum which subsequently crystallised. The solid was ground up with acetone, refiltered and repeatedly recrystallised by precipitation from isopropanol with ether to give pure N-o-bromobenzyl-N-ethylpyrrolidinium bromide, melting point 95–96°.

EXAMPLE 33

Tablets (a) Tablets were made by granulating the salt in fine powder with equal parts of alcohol and water. Magnesium stearate as a lubricant was added and the mixture compressed directly.

|  | Grams |
|---|---|
| N-benzyl-N-2-hydroxyethyl-N:N-dimethylammonium bromide or p-toluenesulphonate | 0.5 |
| Magnesium stearate | 0.005 |

Compressing weight 0.505 gram.

(b) Suitable tablets were also prepared as follows:

|  | Mgm. |
|---|---|
| N-benzyl-N-2-hydroxyethyl-N:N-dimethylammonium bromide or p-toluenesulphonate in fine powder | 250 |
| Lactose | 250 |
| Starch | 50 |
| Magnesium stearate | 5 |
|  | 555 |

The N-benzyl-N-2-hydroxyethyl-N:N-dimethylammonium salt and the lactose and starch were mixed and granulated with alcohol or alcoholic polyvinyl pyrrolidone or a mixture of equal parts of alcohol in water. The granules were dried at about 40°, magnesium stearate added and the mixture compressed.

(c) Tablets made as described under (a) were sugar coated by first giving them a thin coat of shellac in alcohol solution and then sugar coating by the normal methods.

(d) Tablets made as described under (a) were enteric coated by applying cellulose acetate phthalate or other suitable enteric coating in suitable solvents. A suitable solvent for cellulose acetate phthalate is a mixture of equal parts of ethyl acetate and ethyl alcohol containing 10% of added ethyl lactate.

Similar preparations containing N-benzyl-N-ethyl-N-2-hydroxyethyl-N-methylammonium, and N-benzyl-N:N-di(2-hydroxyethyl)-N-methylammonium bromides and p-toluenesulphonates were also made as described above.

Similar preparations containing only 100 mgm. of the desired salt were also made as described above.

N - benzyl - N:N - di(2-hydroxyethyl) - N - methylammonium bromide was prepared by a quaternisation reaction and melted at 80–81°.

EXAMPLE 34

Injection Solutions (a) Unit dose ampoule:
  N - benzyl - N - 2 - hydroxyethyl - N:N - dimethylammonium bromide or p-toluenesulphonate _____mgm__ 200
  Water for injection to make 1 ml.

The solution was autoclaved at 15 lb. steam pressure for 30 minutes.

(b) Multidose containers:
  N - benzyl - N - 2 - hydroxyethyl - N:N - dimethylammonium bromide or p-toluenesulphonate _____mgm__ 200
  Water for injection to make 1 ml.
  To the water for injection benzyl alcohol 1%, phenol 0.5%, or chlorocresol 0.1% was added.

The solution was autoclaved at 15 lb. steam pressure for 30 minutes in suitable multidose containers.

Similar preparations containing N-benzyl-N-ethyl-N-2-hydroxyethyl-N-methylammonium and N-benzyl-N:N-di-(2-hydroxyethyl)-N-methylammonium bromides and p-toluenesulphonates were also made as described above.

EXAMPLE 35

Suppositories

Suppositories for rectal administration were prepared to the following formula:

N - benzyl - N - 2 - hydroxyethyl - N:N - dimethylammonium bromide or p-toluenesulphonate in very fine powder _____mgm__ 250
Cocoa butter, or imhausen base, or other suitable suppository base to make 2 g. (aprrrox.).

The suppository base was melted and the very fine powder of N-benzyl-N-2-hydroxyethyl-N:N-dimethylammonium salt was suspended in it. The molten mixture was then poured into suitable suppository moulds.

Similar preparations containing N-benzyl-N-ethyl-N-2-hydroxyethyl-N-methylammonium and N-benzyl-N:N-di-(2-hydroxyethyl)-N-methylammonium bromides and p-toluenesulphonates were also made as described above.

EXAMPLE 36

Capsules

The above mentioned quaternary ammonium salts were readily filled into hard gelatin or soft gelatin capsules; recommended doses are 100 mgm. and 500 mgm. The pure crystalline material was filled directly into the capsules. The bromides are stable in contact with air of 50% relative humidity at 20°, become moist at 80% relative humidity at 20°, and liquefy at over 90% relative humidity at 20°. It is therefore advisable to carry out these operations in an atmosphere of low humidity.

We claim:

1. A process for the treatment of hypertension which comprises the administration of a therapeutically acceptable quarternary ammonium compound containing the cation of the formula:

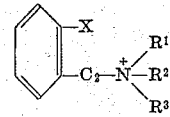

wherein X is selected from the class consisting of (1) a hydrogen atom when $R^1$ is a 2-hydroxyethyl group, $R^2$ is a methyl group and $R^3$ is selected from the class consisting of methyl, ethyl and 2-hydroxyethyl groups, (2) halogen, methyl and nitro groups when $R^1$ is selected from the class consisting of ethyl, 2-hydroxyethyl, isopropyl and allyl groups and $NR^2R^3$ is selected from the class consisting of dimethylamino and pyrrolidino groups and when $R^1$ is a methyl group and $R^2$ and $R^3$ are selected from the class consisting of ethyl and 2-hydroxyethyl groups.

2. A process for the treatment of hypertension which comprises the administration of a therapeutically acceptable quaternary ammonium compound containing the N-benzyl-N-2-hydroxyethyl - N:N - dimethylammonium cation.

3. A process for the treatment of hypertension which comprises the administration of a therapeutically acceptable quaternary ammonium compound containing the N-o-bromobenzyl-N-ethyl-N:N - dimethylammonium cation.

4. A process for the treatment of hypertension which comprises the administration of a therapeutically acceptable quaternary ammonium compound containing the N - o - bromobenzyl - N - 2 - hydroxyethyl - N:N - dimethylammonium cation.

5. A process for the treatment of hypertension which comprises the administration of a therapeutically acceptable quaternary ammonium compound containing the N - o - methylbenzyl - N - 2 - hydroxyethyl - N:N - dimethylammonium cation.

6. A process for the treatment of hypertension which comprises the administration of a therapeutically acceptable quaternary ammonium compound containing the N - o - bromobenzyl - N - ethylpyrrolidinium cation.

References Cited in the file of this patent

UNITED STATES PATENTS

| | | |
|---|---|---|
| 2,592,191 | Ruddy | Apr. 8, 1952 |
| 2,746,965 | Biel | May 22, 1956 |
| 2,746,966 | Biel | May 22, 1956 |
| 2,746,967 | Biel | May 22, 1956 |
| 2,784,195 | Burtner | Mar. 5, 1957 |
| 2,893,914 | Cavallito | July 7, 1959 |
| 2,895,995 | Willey et al. | July 21, 1959 |
| 2,899,357 | Cavallito et al. | Aug. 11, 1959 |

FOREIGN PATENTS

| | | |
|---|---|---|
| 765,850 | Great Britain | Jan. 16, 1957 |

OTHER REFERENCES

Allen et al.: Proc. of the Staff Meetings of the Mayo Clinic, 29:17, pages 459–478, August 25, 1954.

UNITED STATES PATENT OFFICE

CERTIFICATE OF CORRECTION

Patent No. 3,037,910            June 5, 1962

Frederick Charles Copp et al.

It is hereby certified that error appears in the above numbered patent requiring correction and that the said Letters Patent should read as corrected below.

Column 12, lines 9 to 13, the formula should appear as shown below instead of as in the patent:

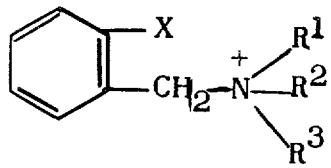

Signed and sealed this 25th day of September 1962.

(SEAL)
Attest:

ERNEST W. SWIDER            DAVID L. LADD
Attesting Officer            Commissioner of Patents